A. J. GRISSOM.
AUTOMATIC WEIGHING CABINET.
APPLICATION FILED FEB. 1, 1910.
976,069.
Patented Nov. 15, 1910.
3 SHEETS—SHEET 1.
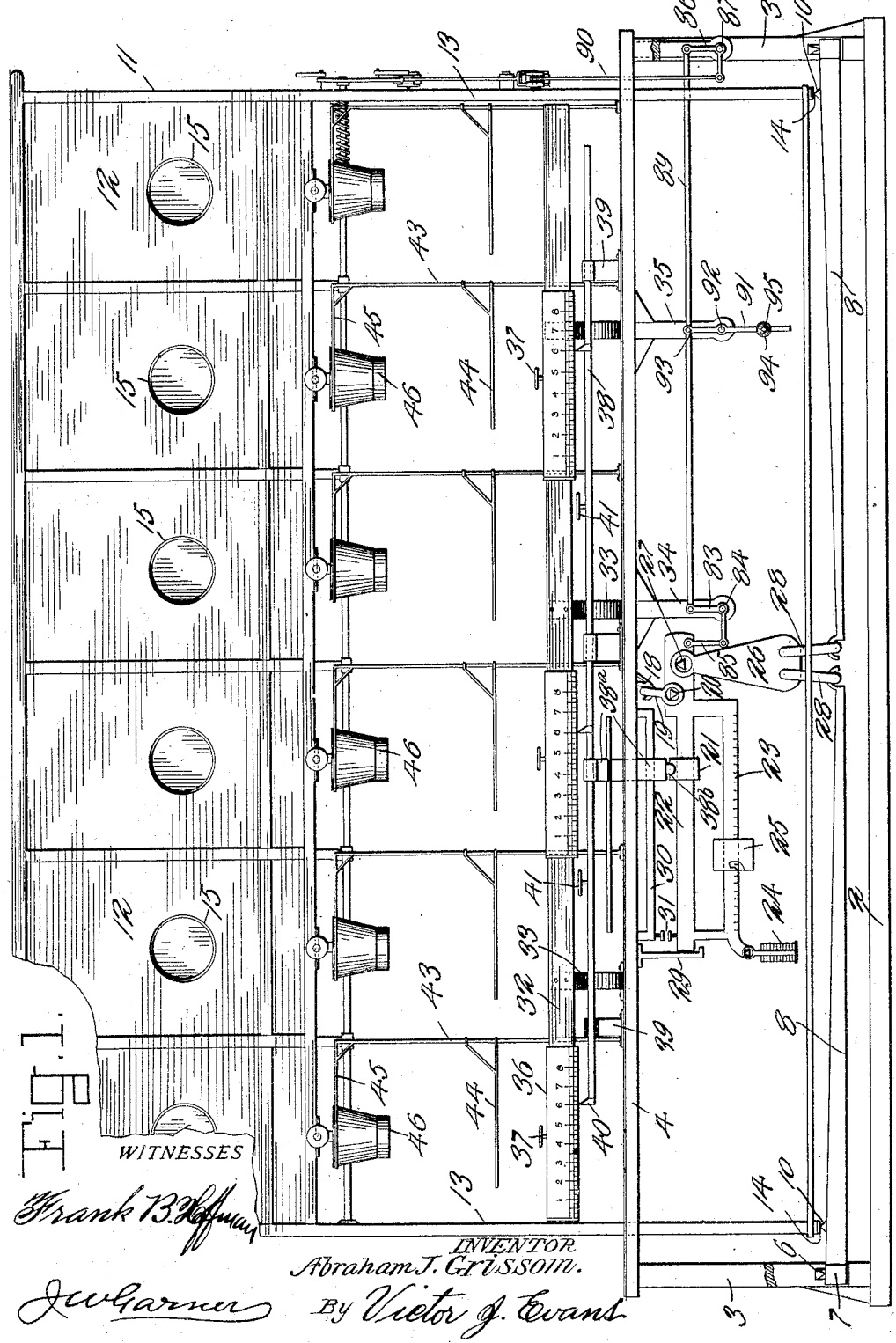
WITNESSES
Frank B. Hoffman
J. W. Garner
INVENTOR
Abraham J. Grissom.
By Victor J. Evans

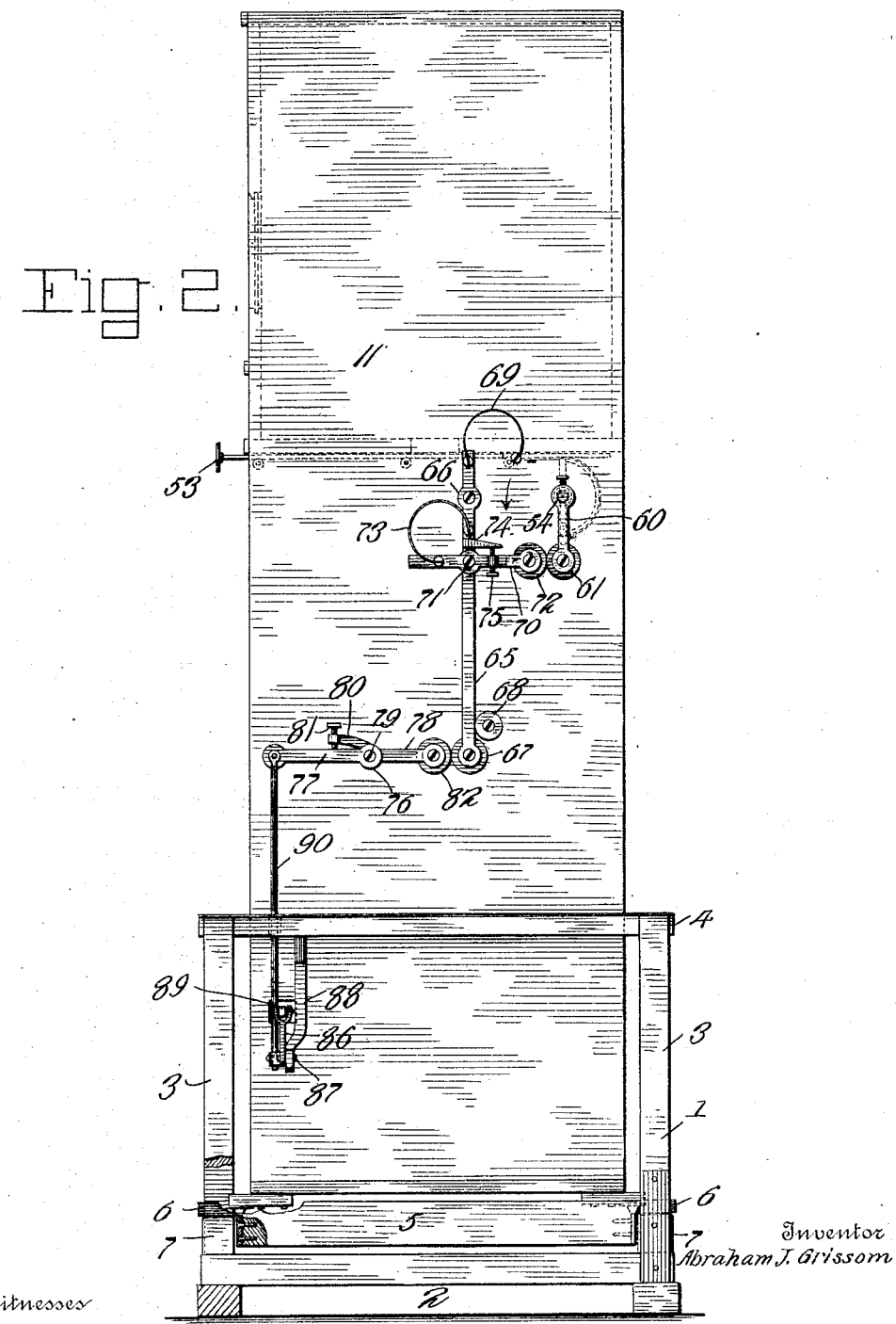

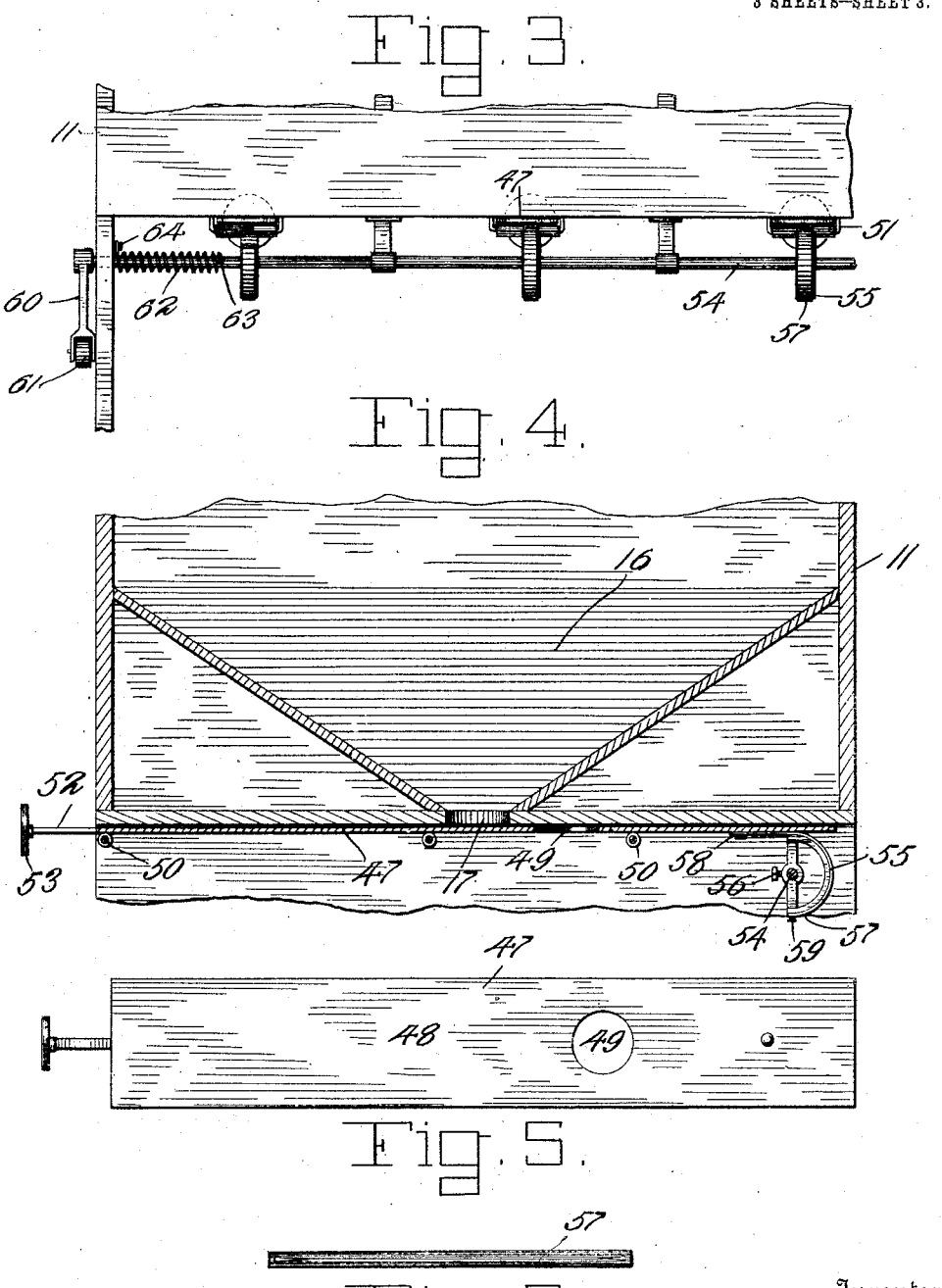

UNITED STATES PATENT OFFICE.

ABRAHAM J. GRISSOM, OF YEAGER, OKLAHOMA.

AUTOMATIC WEIGHING-CABINET.

976,069.　　　Specification of Letters Patent.　　Patented Nov. 15, 1910.

Application filed February 1, 1910. Serial No. 541,311.

*To all whom it may concern:*

Be it known that I, ABRAHAM J. GRISSOM, a citizen of the United States, residing at Yeager, in the county of Hughes and State of Oklahoma, have invented new and useful Improvements in Automatic Weighing-Cabinets, of which the following is a specification.

This invention relates to improvements in automatic weighing cabinets for dispensing commodities by weight and automatically and accurately weighing the commodities as the same are dispensed, the said invention consisting broadly in the combination of a receptacle having means to cause material to be discharged therefrom, a scale beam, connections between the receptacle and scale beam to cause the scale beam to sustain the gross weight of the receptacle and its contents, means to balance the scale beam and a weighing weight for application to the scale beam.

The invention further consists in the construction, combination, and arrangement of devices hereinafter described and claimed.

In the accompanying drawings, Figure 1 is a front elevation of an automatic weighing cabinet constructed in accordance with my invention. Fig. 2 is an end elevation of the same. Fig. 3 is a detail elevation from the rear side, showing a portion of the cabinet, the valve and other connections. Fig. 4 is a detail sectional view of the lower portion of one of the bins, showing its valve and connections. Fig. 5 is a detail plan of one of the valves. Fig. 6 is a similar view of one of the valve straps.

In accordance with my invention I provide a base which is here shown as a frame 1, the sills 2 of the base are provided at the corners of the frame with standards 3 which support a table 4. In the ends of the frame 1 near the base thereof are tie bars 5 which are provided at their ends with scale bearings 6 which rest their lower feather edges on bearing blocks 7. Scale arms 8 which are disposed near the front side of the base frame have their outer ends secured to the said tie bars, each of the tie bars having a pair of the scale arms as will be understood. The said scale arms are provided at a suitable distance from their outer ends with upwardly extending triangular bearings 10.

A cabinet 11 is provided in its upper side with a series of bins 12 of which there are a suitable number. The ends 13 of the cabinet extend down through and are vertically movable in openings in the table 4 and bear upon the bearings 10 so that the cabinet together with the contents of its bins is entirely sustained by the scale arms, 8, 9, bearing plates 14, made of hardened steel or the like being here shown as interposed between the bearings 10 and the under sides of the ends of the cabinet. Each of the bins 12 is shown as having a glazed opening 15 in its front wall so that its contents may be observed and preferably the lower sides of the bins are hopper shaped as at 16 to facilitate the down passage of material through them, each bin having in its bottom an opening 17.

A hook 18 depends from the table 4 and supports a clevis 19 in which are mounted the bearings 20 of a scale beam having a weight arm 22 and a balancing arm 23. Said balancing arm may be provided with any suitable number of removable weights 24 and is also provided with a balancing weight 25 which is slidable longitudinally thereon. A link 26 is pivotally connected as at 27 to the scale beam at a suitable point and is connected to the free inner ends of the scale arms 8 by means of link devices 28. A stop 29 to limit the downward movement of the free end of the scale beam is secured to and depends from the table 4. A longitudinally disposed guide bar 30 is also on the under side of and connected to the table and is disposed above the scale beam. Said guide bar and scale beam have adjustable stops 31 to limit the upward movement of free end of the scale beam. A scale plate supporting bar 32 is disposed longitudinally of the table on the front side thereof, extends nearly from end to end thereof and is supported at a suitable distance above the said table by means of brackets 33. One of said brackets has a downwardly extending arm 34 and another has an arm 35. On the said bar 32 are a number of scale plates 36 of which there is one for each pair of bins, the said scale plates being movable on the said bar and being provided with set screws 37 for clamping them on said bar at the required adjustment. An indicating and weight operating rod 38 is mounted for longitudinal movement in standards 39 which extend upwardly from the front side of the table. The said rod is provided with pointers 40 which respectively operate in connection with the respective scale plates, there being one of these pointers for each scale plate, shiftable with relation thereto by the movements of the rod 38. Said rod is provided at suitable points with thumb pieces 41 to enable it to be readily moved manually as may be required to set the pointers 40 at the required places indicating the desired weight of material on the scale plates.

Bag supporting devices 43 are mounted on and carried by the table and are disposed under the bins of the cabinet, there being one of such devices under each bin. Each of the said bag supporting devices has a bracket 44 on which a paper bag or the like may be placed and is also provided with a bracket arm 45. Each bracket arm carries a funnel 46, one of these funnels being disposed at a suitable distance below the discharge opening of each of the bins so that material discharged from a bin passes through one of the funnels and into a paper bag or other suitable receptacle on the platform 44 beneath said funnel. Under the bottom of each bin is a valve 47 which comprises a plate 48 having an opening 49. Each valve plate is supported by suitable rollers 50 which are mounted on guides 51 that depend from the bottom of the bin. Said valves are movable longitudinally in said guides and on said rollers to bring the openings 49 into or out of register with the discharge opening 17 of the bins and each valve has at its front end a forwardly extending arm 52 provided with a suitable handle or button 53 which may be readily grasped to enable the valve to be manipulated. A valve operating rock shaft 54 is mounted in bearings in the ends of the cabinet below the bins, extends from end to end of the cabinet and is disposed near the rear side thereof and under the valves. Said shaft has secured thereto a series of pulleys 55, here shown as segments, there being one for each valve disposed in line therewith and the said segments being here shown as secured on the said rock shaft by means of set screws 56.

Each valve is conected to its pulley segment by a flexible strap 57, one end of the strap being secured to the under side of the valve as at 58 and the other end thereof being secured on the periphery of the pulley segment as at 59. At one end of said valve operating rock shaft is a stop arm 60 which is disposed on the outer side of one end of the cabinet and is provided at its free end with a roller 61. A spring 62 operates on the said rock shaft to turn the same in one direction to cause the valves to be moved to closed position. Said spring is here shown as a coil spring disposed on the said rock shaft having one end attached thereto as at 63 and the other end attached to the cabinet as at 64. A trip device which is here shown as a pendulum bar 65 is pivoted near its upper end on the end of the cabinet as at 66 and is provided at its lower end with a roller 67. A stop 68 is on the said end of the cabinet and said pendulum rod or trip device normally bears against one side of said stop and is normally disposed in vertical position. A spring 69 is here shown as having one end connected to the cabinet and the other end connected to the upper end of said trip device 65, the function of said spring being when the said trip device is released by the mechanism hereinafter described to swing the lower end of said trip device forwardly from the said stop 68. A tappet bar 70 is pivoted as at 71 on the said trip device and extends substantially at right angles thereto. At one end of said tappet bar is a roller 72 for engagement with the roller 61 of the stop arm 60. A spring 73 has one end connected to said tappet bar near the front end thereof and the other end connected to the trip device 65 at a point above the pivot 71, the said spring tending to move that end of the tappet bar which carries the roller 72 upwardly. An arm 74 projects from the trip device and is engaged by an adjusting screw 75 which is carried by the tappet bar, the said adjusting screw coacting with the spring 73 to mount the tappet bar at any required adjustment as will be understood.

A locking device 76 is here shown as comprising a bar having sections 77, 78, which are independently mounted on one end of the cabinet by a pivot 79. The section 78 has a curved arm 80 which extends partially over the section 77 and is provided with an adjusting screw 81 which bears on said section 77. Hence the section 78 is rendered capable of slight angular movement with reference to the section 77 and may be disposed either directly in line therewith as here shown or at a slight angle with reference thereto as may be required for purposes of adjustment. Said adjustable section or member 78 or the like element is provided with a roller 82 which normally bears against the roller 67 of the trip element 65 to hold the latter in the vertical position shown in Fig. 2. The said lock element is connected to the scale beam for operation thereby by means which I will now describe.

A bell crank 83 is pivotally mounted as at 84 on the arm 34 of one of the brackets 33. Said bell crank has a vertical arm and a horizontal arm, the latter being connected to the scale beam by a link 85. A similar bell crank 86 is pivotally mounted as at 87 on a bracket 88 which depends from one side of the table. The vertical arms of the said bell cranks are connected by a link rod 89. The horizontal arm of the bell crank 86 is connected to the front end of the locking device 76 by a link rod 90. A rock bar 91 is pivotally mounted as at 92 on the arm 35 of one of the brackets 33, has its upper end pivotally connected as at 93 to the link rod 89 and its lower portion is provided with a weight 94 which is adjustable thereon and may be secured at any desired adjustment by means of a set screw 95.

A weight 21 is slidable on the weight arm 22 of the scale beam and an arm 38ª is attached to and movable with and by the indicating and weight operating rod 38, the said arm having at its lower end a projection or rib 38ᵇ and the said weight 21 having a recess in its upper side adapted to be engaged by the said rib or projection.

The operation of the invention is as follows: The gross weight of the cabinet with its contents being carried by the scale arms 8—9, said arms tend to move downwardly and their free ends being connected by the links 26—28 to the shorter arm of the scale beam, the latter tends to move upwardly. The scale beam is balanced by means of the weights 24—25. Initially all of the valves 47 are in closed position so as to cut off the discharge openings 17 of the bins. When a desired quantity of a commodity in one of the bins is to be dispensed to a customer and weighed, the salesman places a suitable sack or other receptacle on the bracket 44 under such bin and in position to be filled through the funnel 46, and this done he places his foot on the platform, thereby causing increased weight to be applied to the shorter arm of the scale beam and hence causing the scale beam to rise and engage the weight 21 with the arm 38ª. He then moves the rod 38 to cause one of its indicators to be placed opposite the number on the scale plate 36 indicating the desired quantity or number of pounds of the commodity, such movement of the said rod 38 causing the weight 21 to be moved correspondingly and set at the required point on the weight arm 22 of the scale beam. The operator then removes his foot from the platform. Initially the shaft 54 is held by the action of the spring 62 in such position as to keep all the valves 47 closed and the stop arm 60 in a vertical position and extending above said shaft 54. The salesman draws outwardly on the appropriate valve 47 so as to cause its opening 49 to register with the discharge opening 17 of the bin from which the commodity is to be dispensed and weighed, thereby causing the rock shaft 54 to turn against the tension of the spring 62 and in the direction indicated by the arrow in Fig. 2, so that the stop arm 60 is turned downwardly to the position shown in said figure and with its roller 61 bearing against the roller 72 of the tappet bar 70. The commodity passes by gravity from the designated bin to the paper bag or other receptacle and as it accumulates in said bag the gross weight of the cabinet and its contents decreases. At the instant that the required quantity of the commodity has been thus deposited in the bag or other receptacle the scale beam descends so that its shorter arm moves upwardly and through the connections 85, 83, 89, 86, and 90, hereinbefore described, causes the section 77 of the lock device 76 to rise and the section 78 thereof to descend so as to clear the roller 82 from the roller 67 of the trip device 65, whereupon said trip device is swung by the action of the spring 69 to an inclined position so as to cause the roller 72 to descend and clear the roller 61, at which instant the spring 62 acts to return the rock shaft 54 to its initial position and hence the pulley 55 on said rock shaft connected to the valve, which has been opened instantly, causes said valve to close and thereby cut off the further discharge of the commodity from the bin.

The tappet bar 70 may be adjusted by means of the spring 73 and screw 75, as may be required to secure exact accuracy of the scales and enable the stop arm 60 to be cleared by the said tappet at the required instant of time to secure such accuracy. The section 78 may be adjusted angularly with respect to the section 77 of the lock arm 76 by means of the screw 81, as may be required to so adjust the tappet 82 of said locking bar or device 76 to clear the roller 67 of the pendulum bar or trip device 65 when the exact quantity of the commodity required has been weighed and hence the scale may be rendered exceedingly sensitive and absolute accuracy thereof secured. This end is also promoted by means of the weight 94, which is adjustable on the rock bar 91, which is connected to the link rod 89.

Having thus described the invention what is claimed as new, is:—

1. The combination of a receptacle having discharge means for material therein, a valve to cut off the discharge of material from the receptacle, a scale having an element connected to and sustaining the gross weight of the receptacle and its contents, and means automatically controlled by the scale to close the valve when a predetermined weight of material has been discharged from the receptacle.

2. The combination of a receptacle having discharge means for material therein, a valve to cut off the discharge of material from the receptacle, means constituting a spring to close the said valve, a scale having an element connected to and sustaining the gross weight of the receptacle and its contents, and means operated by said scale element to control the operation of the valve closing means.

3. The combination of a cabinet having a plurality of bins, each provided with a discharge valve, means to close said valves, said valve closing means enabling said valves to be placed in open position independently of one another, a scale having an element connected to and sustaining the gross weight of the cabinet and the contents of its several bins, and means operated by said scale element to automatically control the action of the valve closing means.

4. The combination of a cabinet having a plurality of bins, each provided with a discharge valve, means to close said valves, said valve closing means enabling said valves to be placed in open position independently of one another, a scale beam connected to and sustaining the gross weight of the cabinet and the contents of its several bins, means to balance said beam, a weighing weight on said beam, means to adjust said weight, and means operated by said scale beam to automatically control the action of the valve closing means.

5. In apparatus of the class described, the combination of a receptacle having a discharge valve, means to close said valve and including a movable stop element having a tappet roller, a scale beam, a pivotally mounted trip element having an adjustable element thereon provided with a tappet roller for engagement with that of the stop element to hold the valve closing means in check, a locking device to engage and hold said trip element, and connections between the said beam and the said locking device, for the purpose set forth.

6. In an apparatus of the class described, the combination of a receptacle having a discharge valve, means to close said valve and including a stop element, a scale beam, a pivotally mounted trip element to engage the said stop element to hold the valve closing means in check, said trip element having a tappet roller, and a pivotally mounted locking device connected to and operated by the scale beam, said locking device having an adjustable device provided with a tappet roller for engagement with that of the trip element.

7. In apparatus of the class described, the combination of a receptacle having a discharge valve, means to close said valve and including a movable stop element having a tappet roller, a scale beam, a pivotally mounted trip element having a tappet roller, and also having an adjustable element provided with a tappet roller for engagement with that of the stop element, to hold the valve closing means in check, and a pivotally mounted locking device connected to and operated by the scale beam, said locking device having an adjustable device provided with a tappet roller for engagement with the first mentioned tappet roller of the said trip element.

In testimony whereof I affix my signature in presence of two witnesses.

ABRAHAM J. GRISSOM.

Witnesses:
R. B. COLLIER,
J. C. CARROLL.